(12) United States Patent
Kishida

(10) Patent No.: US 9,152,361 B2
(45) Date of Patent: Oct. 6, 2015

(54) INFORMATION PROCESSING APPARATUS AND METHOD THEREFOR

(71) Applicant: CANON KABUSHIKI KAISHA, Tokyo (JP)

(72) Inventor: Akira Kishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/180,539

(22) Filed: Feb. 14, 2014

(65) Prior Publication Data

US 2014/0233050 A1 Aug. 21, 2014

(30) Foreign Application Priority Data

Feb. 19, 2013 (JP) .................................. 2013-029949

(51) Int. Cl.
*G06F 15/00* (2006.01)
*G06F 3/12* (2006.01)
*G06F 9/44* (2006.01)

(52) U.S. Cl.
CPC ............ *G06F 3/1225* (2013.01); *G06F 3/1204* (2013.01); *G06F 3/1284* (2013.01); *G06F 9/4411* (2013.01)

(58) Field of Classification Search
CPC ...................................................... G06F 3/1225
USPC ......................................................... 358/1.13
See application file for complete search history.

(56) References Cited

U.S. PATENT DOCUMENTS

2012/0281251 A1* 11/2012 Salgado et al. .............. 358/1.15

FOREIGN PATENT DOCUMENTS

JP 2010-160616 A 7/2010

* cited by examiner

*Primary Examiner* — Saeid Ebrahimi Dehkord
(74) *Attorney, Agent, or Firm* — Canon USA Inc. IP Division

(57) ABSTRACT

An information processing apparatus that communicates with a peripheral device searches for a generic driver corresponding to compatible identification information of the peripheral device, if a specific driver corresponding to model information of the peripheral device has been found and if a setting is enabled to use a generic driver, and controls installation of the generic driver if the generic driver has been found.

13 Claims, 14 Drawing Sheets

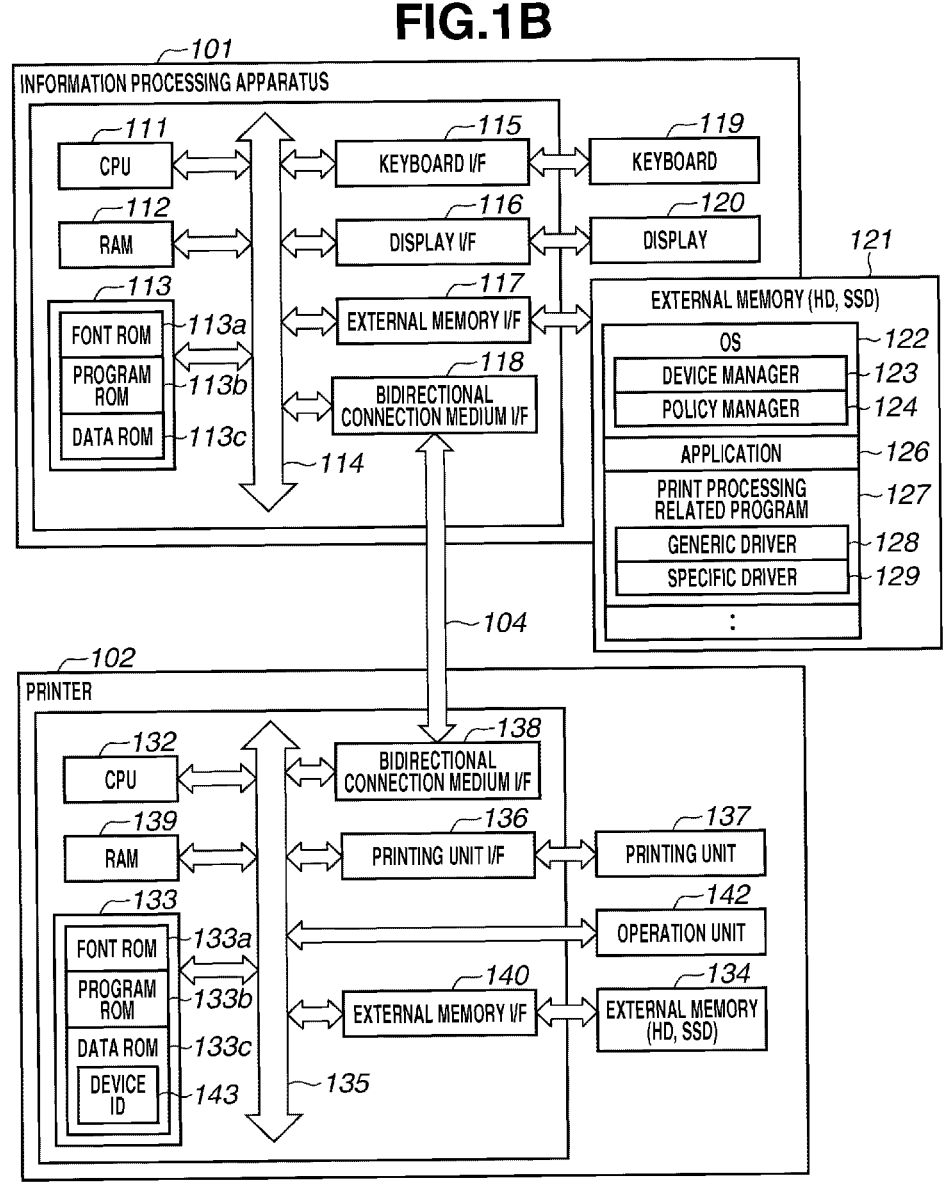

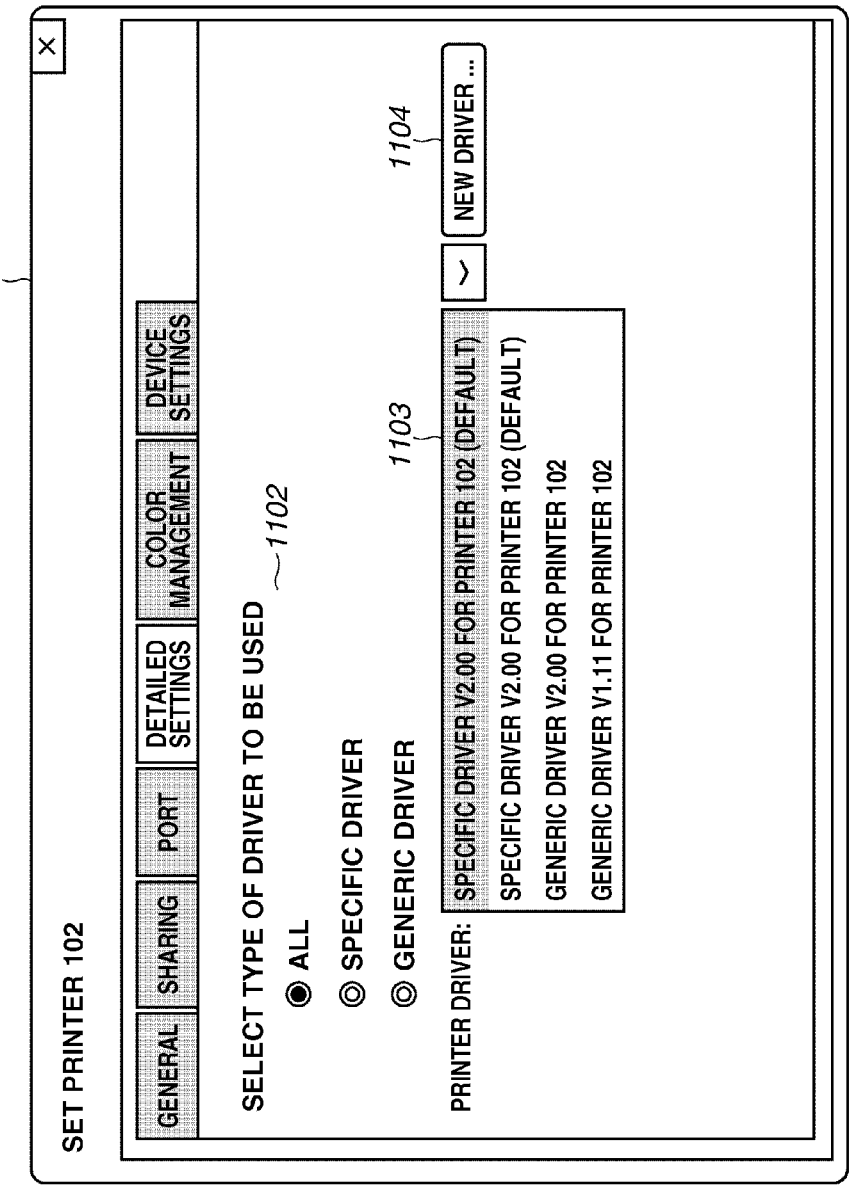

FIG.12A

DEVICE ID ~143

| MANUFACTURER (MFG) |
| COMMAND (CMD) |
| MODEL (MDL) |
| COMPATIBLE ID (CID) |

FIG.12B

EXAMPLE OF DEVICE ID

MANUFACTURER:ABC;COMMAND SET:PCL;MODEL:M123;COMPATIBLEID:Class1;

INFORMATION PROCESSING APPARATUS AND METHOD THEREFOR

BACKGROUND OF THE INVENTION

1. Field of the Invention

The present disclosure generally relates to information processing and, more particularly, to a technique for controlling installation of a printer driver.

2. Description of the Related Art

To use a peripheral device such as a printer via an information processing apparatus, software such as a device driver that supports the peripheral device generally needs to be installed into a processing system (e.g., an operating system (OS)) that operates on the information processing apparatus. When the printer is used, printing can be performed on a sheet or sheets by starting a printer driver from an application, performing settings for the printing, and transferring data acquired from the application to the printer.

As a technique for installing, when a peripheral device such as a printer is connected to the information processing apparatus, a device driver for using the connected peripheral device into the computer, Plug and Play (PnP) has been well known. By using the PnP technique, a user can be released from complicated installation work and setting work of the driver for using the peripheral device, resulting in significantly improved convenience.

In PnP executed for a printer by Windows (registered trademark) that is an OS of Microsoft Corporation in the United states, identification information is acquired from a printer via an interface of a universal serial bus (USB) or a web service on devices (WSD). An OS searches for an optimum device driver based on the acquired identification information, installs the device driver, and sets a connection destination at which the printer has been detected as an output destination. In the PnP, the OS acquires model identification information (MDL) of the printer from the printer, searches for a printer driver corresponding to the MDL, and installs the printer driver. In this case, a specific driver serving as a printer driver uniquely corresponding to the printer is searched for. If the printer driver corresponding to the MDL has not been found, the OS acquires compatible identification information (CID) of the printer, searches for a printer driver corresponding to the CID, and installs the printer driver. If the CID has been used, a generic driver serving as a printer driver that can be shared among a plurality of printer models has been introduced. A generic driver that is shared among printers in a printer class is also referred to as a class driver.

A case where a generic driver has already been installed when a printer is newly detected on a network is assumed. In this case, using the already installed generic driver without performing the processing for newly searching for and installing a printer driver can provide an environment for the new printer to perform printing easily and quickly. Further, the generic driver can provide similar setting screens and usage to the printers that the generic driver supports regardless of models.

As a conventional technique, Japanese Patent Application Laid-Open No. 2010-160616 discusses a technique for selecting, if a class driver has already been installed when a specific driver corresponding to model identification information is to be installed, whether to delete the existing class driver or to cause the class driver and the specific driver to coexist.

However, the printing system discussed in Japanese Patent Application Laid-Open No. 2010-160616 is implemented by a technique using a dedicated installer, and is not compatible with an installation method using PnP. If a printer driver to be updated exists, automatic updating of the printer, which is an advantage of PnP, cannot be performed.

To solve the above-mentioned issue, when installation of a device driver is started, installation of a specific driver and a generic driver needs to be flexibly controlled by assuming PnP.

Installation using PnP needs to be controlled by selecting the type of device driver to be used according to the system setting specified by a user or a group policy.

SUMMARY OF THE INVENTION

According to an aspect of the present disclosure, an information processing apparatus that communicates with a peripheral device includes a receiving unit configured to receive model information and compatible identification information as device information from the peripheral device, a first search unit configured to search for a specific driver for the peripheral device corresponding to the model information, a second search unit configured to search for a generic driver corresponding to the compatible identification information, and a control unit configured to control, if a setting is enabled to use a generic driver, installation of the generic driver found by the second search unit even if the first search unit has found the specific driver. Further, the control unit controls installation of the specific driver if the first search unit has found the specific driver and if the setting is not enabled to use a generic driver.

Further features of the present disclosure will become apparent from the following description of exemplary embodiments with reference to the attached drawings.

BRIEF DESCRIPTION OF THE DRAWINGS

FIG. 1A is a block diagram illustrating a system configuration, and FIGS. 1B and 1C are block diagrams illustrating respective internal configurations of apparatuses according to a first exemplary embodiment of the present disclosure.

FIG. 11 illustrates an example of a user interface according to the third exemplary embodiment.

FIGS. 12A and 12B respectively illustrate a content of a device ID retained by a printer and an example of the device ID according to the first exemplary embodiment.

DESCRIPTION OF THE EMBODIMENTS

Figure 1C:
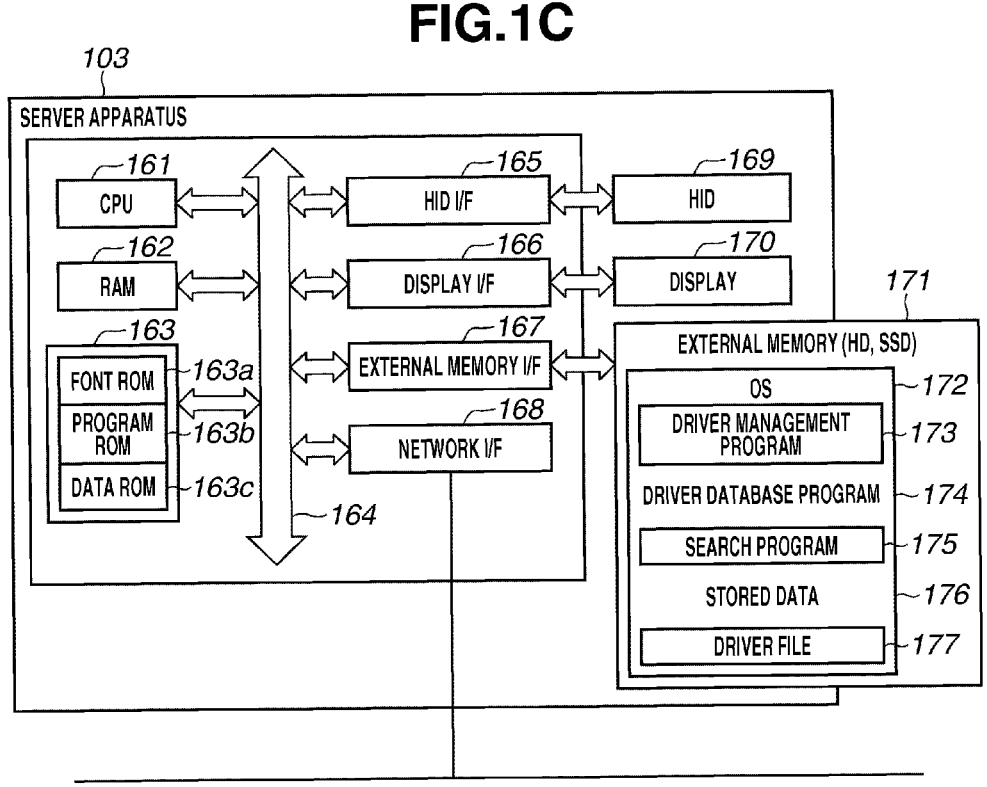

Various exemplary embodiments, features, and aspects of the disclosure will be described in detail below with reference to the drawings.

FIG. 1A is a block diagram illustrating a schematic configuration of a system according to a first exemplary embodiment of the present disclosure. The system includes an information processing apparatus 101 and its peripheral device. The peripheral device includes a printer 102 that receives print data from the information processing apparatus 101 using a corresponding device driver to perform printing. The printer 102 and the information processing apparatus 101 are connected to each other via a connection medium 104 capable of bidirectional communication, such as a USB or an Ethernet (registered trademark). The information processing apparatus 101 and a server apparatus 103 are connected to each other via a connection medium 105 capable of bidirectional communication such as the Internet or an intranet. The server apparatus 103 may be more than one.

FIG. 1B is a block diagram illustrating respective configurations of the information processing apparatus 101 and the printer 102 illustrated in FIG. 1A. In the information processing apparatus 101, a central processing unit (CPU) 111 comprehensively controls each of the devices connected to a system bus 114 according to a program stored in a random access memory (RAM) 112. The RAM 112 also functions as a main memory or a work area of the CPU 111. A read-only memory (ROM) 113 stores various types of programs and data. A keyboard interface (I/F) 115 controls a key input from a keyboard 119 or a pointing device such as a touch panel (not illustrated). A display I/F 116 controls display on a display 120. An external memory I/F 117 controls access to an external memory 121 such as a flash memory or a solid state disk (SSD). A bidirectional connection medium I/F 118 is connected to the connection medium 104 and the connection medium 105 that are capable of bidirectional communication, to communicate with the printer 102 and the server apparatus 103. The external memory 121 functions as a storage medium, which is readable by the information processing apparatus 101, storing an OS 122, various types of applications 126, a print processing related program 127, and files such as a user file and an editing file (not illustrated). In the present exemplary embodiment, Windows (registered trademark) of Microsoft Corporation is used as the OS 122. As used herein, the term "unit" generally refers to any combination of software, firmware, hardware, or other component that is used to effectuate a purpose.

A device manager 123 installs and manages a printer driver for a printer class device, i.e., the printer 102 according to the present exemplary embodiment. The device manager 123 calls a PnP manager (not illustrated) serving as a library of the OS 122 for controlling installation of a printer driver using the PnP technique, to perform PnP installation work. A policy manager 124 reflects, when the operation policy for the information processing apparatus 101 is set to operate a printer driver, the settings and restrictions within the information processing apparatus 101 in the OS 122 according to the content of the policy. The content of the policy (not illustrated) is described in the OS 122, and can be set by a manager of the information processing apparatus 101 via the policy manager 124. An application 126 is software that operates on the OS 122, and can also cause the printer 102 to perform printing using the printer driver via an application programming interface (API) of the OS 122. Each of related printer drivers is stored as the print processing related program 127. A generic driver 128 and a specific driver 129 are examples of the related printer drivers.

A class driver, which is usable as the generic driver 128, is previously supplied with the OS 122 as an in-box driver.

A configuration of the printer 102 will be described below. A CPU 132 controls the entire operation of the printer 102. A RAM 139 functions as a main memory or a work area of the CPU 132 and is also used as an output information rasterization area or an environmental data storage area. The RAM 139 also includes a nonvolatile RAM (NVRAM) area, and can expand the memory capacity using an option RAM connected to an expansion port (not illustrated). A ROM 133 includes a font ROM 133a storing various types of fonts, a program ROM 133b storing a control program executed by the CPU 132, and a data ROM 133c storing various types of data. The data ROM 133c retains device information (a device identification (ID) 143) used in installation processing for a printer driver in a conventional printing system or in exemplary embodiments of the present disclosure. Information included in the device ID 143 will be described with reference to FIGS. 12A and 12B, and is used for all the exemplary embodiments of the present disclosure to be described below.

FIGS. 12A and 12B illustrate the device ID 143. As illustrated in FIG. 12A, the device ID 143 is represented in the form of character string information, and includes the following elements as main elements. "Manufacturer (MFG)" represents manufacturer information of a device. "Command (CMD)" represents a command set to which the device corresponds. "Model (MDL)" represents model information of the device. "Compatible Identification (CID)" represents compatible identification information of a family or a class to which the device belongs. The Institute of Electrical and Electronic Engineers (IEEE) 1284 standard includes provision of MFG, MDL, and CMD. However, provision of CID is optional. FIG. 12B illustrates an example of the device ID 143. In this example, the peripheral device is a printer that is manufactured by a manufacturer "ABC", supports "Printer Control Language (PCL)" as a command set, is given a model name "M123", and is given a name "Class1" as compatible identification information.

A bidirectional connection medium I/F 138 sends and receives data to and from the information processing apparatus 101. A printing unit I/F 136 controls an interface with a printing unit 137 serving as a printer engine. An external memory 134 is access-controlled by an external memory I/F 140, includes a hard disk (HD) or an SSD to be connected as an option, and stores font data, an emulation program, form data and the like. If the external memory 134 such as the HD is not connected, the data ROM 133c in the ROM 133 stores information used in the information processing apparatus 101. The data ROM 133c stores the device ID 143 used in the present exemplary embodiment. When the information processing apparatus 101 and the printer 102 have been connected to each other, the printer 102 sends the device ID 143 as device identification information to the information processing apparatus 101. A plurality of external memories 134 may also be included. For example, a plurality of external memories 134 storing an optional font card and a program for interpreting a printer control language of a different language system in addition to a built-in font may be connectable. An operation unit 142 is provided with an operation panel for receiving an operation by a user. A switch and a light emitting diode (LED) display (not illustrated) for the operation are disposed in the operation panel. Further, the operation unit 142 may include a NVRAM (not illustrated) and store printer mode setting information from the operation panel. The CPU 132 outputs an image signal as output information to the printing unit 137 via the printing unit I/F 136 based on a control program stored in the program ROM 133b in the ROM 133. The CPU 132 can control processing for communication with the information processing apparatus 101 via the bidirectional communication medium I/F 138. Through this communication, the printer 102 receives the print data sent from the information processing apparatus 101 and can notify the information processing apparatus 101 of information therein.

FIG. 1C is a block diagram illustrating a configuration of the server apparatus 103. In the server apparatus 103, a CPU 161 comprehensively controls each of the devices connected to a system bus 164 according to a program stored in a RAM 162. The RAM 162 also functions as a main memory or a work area of the CPU 161. A ROM 163 stores various types of programs and data. A human interface device (HID) I/F 165 controls a signal input from an HID 169 such as a keyboard or a pointing device (mouse) (not illustrated). A display I/F 166 controls display on a display 170. An external memory I/F 167 controls access to an external memory 171 such as an HD or an SSD. The external memory 171 functions as a storage medium, which is storable or readable by a computer, storing an OS 172, a driver management program 173, and files such as a user file and an editing file (not illustrated). A driver database program 174 includes a search program 175 according to the present exemplary embodiment. A network I/F 168 is connected to the information processing apparatus 101 via a wireless communication network such as the Internet or a portable communication network, to exchange and control information about a printer driver appropriate for control of the printer 102 connected to the information processing apparatus 101.

The latest generic and specific drivers and policy information can be provided to the information processing apparatus 101 by retaining the latest driver and policy setting data in the server apparatus 103. If the server apparatus 103 exists in an intranet, an operation of a generic driver, which has been subjected to customized settings appropriate for an in-house operation policy, can particularly be performed. Here, the generic driver subjected to customized settings is, for example, a generic driver operated only within a company, of which a specific print setting has been restricted, the default setting has been changed, or the user interface has been changed.

A generic driver, which can be subjected to customized settings, is not the above-described class driver supplied with the OS 122, but a generic driver (also referred to as a universal driver) serving as an out-of-box driver provided by a printer vender, etc. In search processing for a printer driver based on compatible identification information (CID), both the generic driver and the class driver are found.

Figure 2:
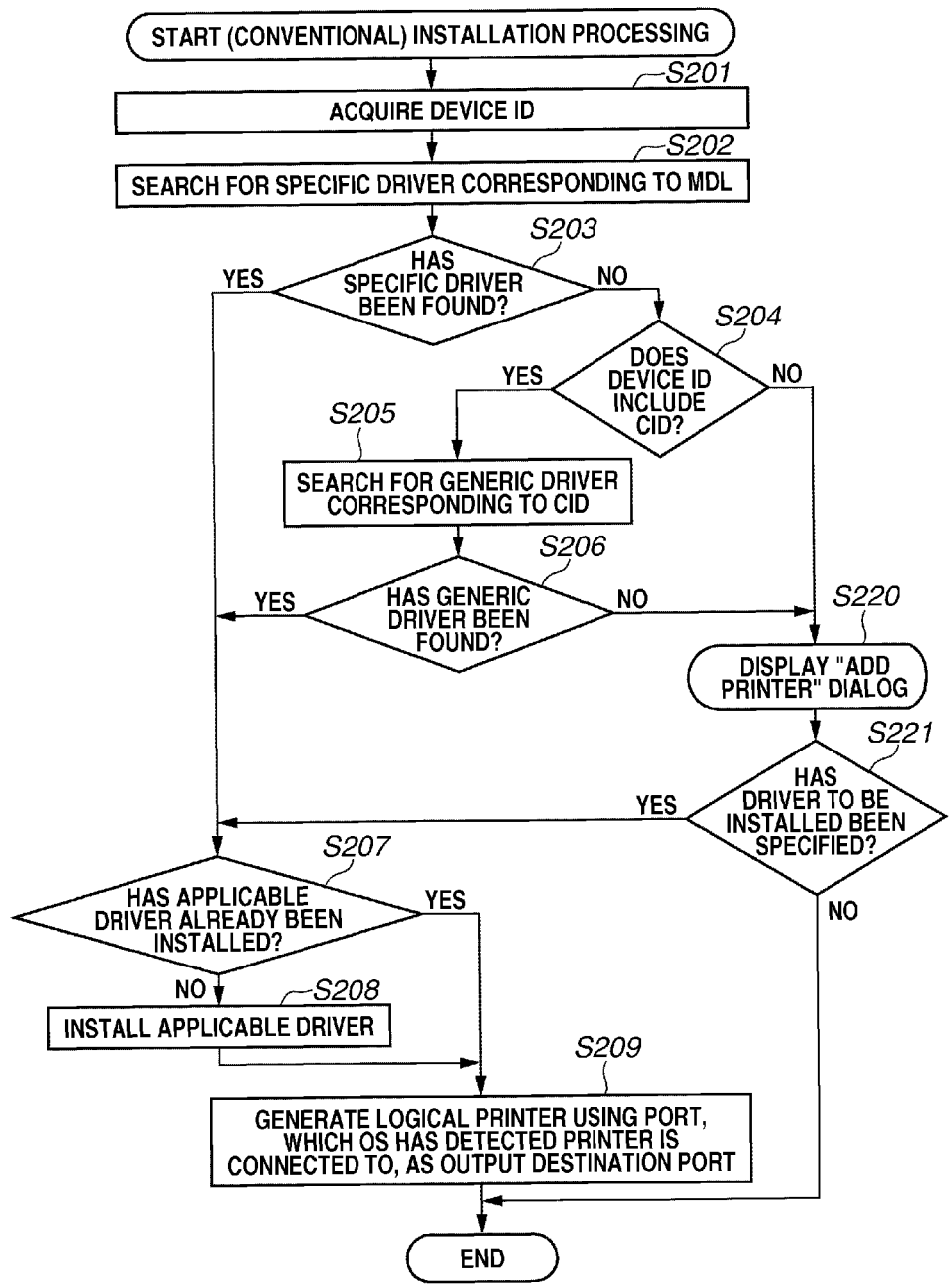
FIG. 2 is a flowchart illustrating an example of installation processing for a printer driver in a conventional printing system.

FIG. 2 is a flowchart illustrating an example of installation processing for a printer driver in a conventional printing system. First, the OS 122 in the information processing apparatus 101 detects that the printer 102 has been connected thereto via the connection medium 104, and starts the installation processing.

In step S201, the device manager 123 issues a request for acquiring the device ID 143 to the printer 102, and acquires the device ID 143 from the printer 102 as a response to the request. The device manager 123 further acquires model identification information (MDL) included in the acquired device ID 143. The content of information retained by the device ID 143 will be described below with reference to FIGS. 12A and 12B. In step S202, the device manager 123 searches for a specific driver 129 corresponding to the MDL.

In step S203, the device manager 123 determines whether the specific driver 129 corresponding to the MDL has been found. If the specific driver 129 has been found (YES in step S203), the processing proceeds to step S207. If the specific driver 129 has not been found (NO in step S203), the processing proceeds to step S204.

In step S204, the device manager 123 checks whether the device ID 143 includes compatible identification information (CID). If the device ID 143 includes the CID (YES in step S204), the processing proceeds to step S205. If the device ID 143 does not include the CID (NO in step S204), the processing proceeds to step S220. In step S205, the device manager 123 searches for a generic driver 128 corresponding to the CID. In step S206, the device manager 123 determines the presence or absence of the generic driver 128. If the generic driver 128 has been found (YES in step S206), the processing proceeds to step S207. If the generic driver 128 has not been found (NO in step S206), the processing proceeds to step S220.

Figure 3:
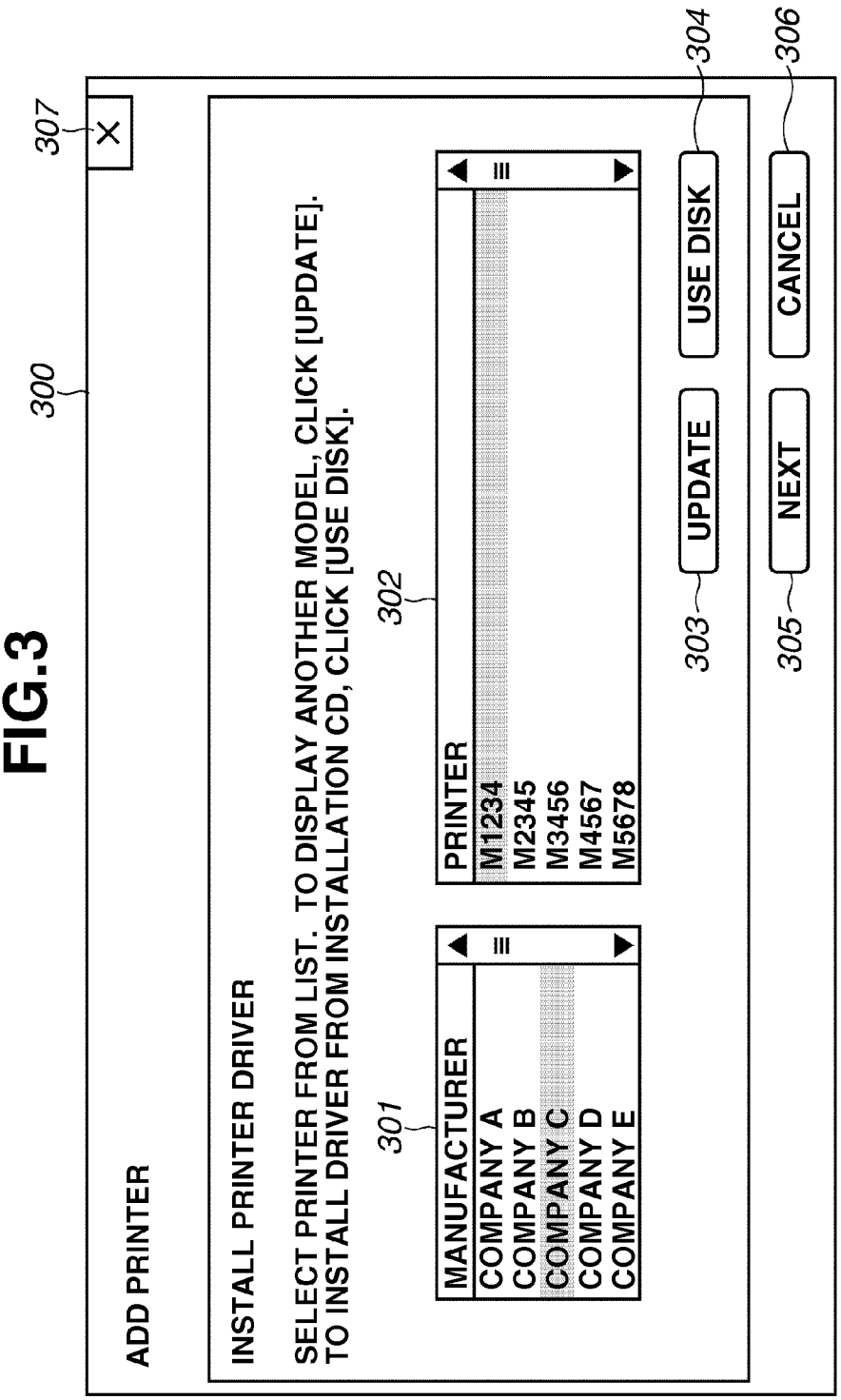
FIG. 3 illustrates an example of a user interface for adding a printer.

In step S220, the device manager 123 displays a dialog for receiving an input from the user to add a logical printer. FIG. 3 illustrates an example of an Add Printer screen. The dialog is displayed to receive an input for a printer driver to be installed from the user. In step S221, the device manager 123 waits for the user to specify the printer driver to be installed, and checks whether the printer driver to be installed has been specified by the user. If the printer driver to be installed has not been specified (NO in step S221), the device manager 123 does not perform processing for installing a printer driver or adding a printer, and the processing is ended. If the printer driver to be installed has been specified by the user (YES in step S221), the processing proceeds to step S207.

In step S207, the device manager 123 checks whether the printer driver, which has been instructed to be installed, has already been installed in the information processing apparatus 101. If the applicable printer driver has not been installed in the information processing apparatus 101 (NO in step S207), the processing proceeds to step S208. If the applicable printer driver has already been installed (YES in step S207), the processing proceeds to step S209. In step S208, the device manager 123 performs processing for installing the applicable printer driver in the information processing apparatus 101. In step S209, the device manager 123 generates a logical printer using a port, which the OS 122 has detected the printer 102 is connected to, as an output destination port. A "logical printer" is a logical object for using a printer driver, and is an object to be referred to as a "printer" when a print application performs printing. One logical printer has one print queue.

FIG. 3 illustrates an example of the dialog to be displayed at the timing in step S220 illustrated in FIG. 2. The user uses an Add Printer dialog 300 to specify a printer driver to be installed.

The user can start installation processing for a printer driver by selecting a desired printer using manufacturer (301) and printer (302) drop-down combo boxes and then pressing a Next button 305. When the user presses an Update button 303, the device manager 123 connects to the server apparatus 103 through the connection medium 105 capable of bidirectional communication, such as the Internet or an intranet, from the bidirectional connection medium I/F 118 via the OS 122. The driver management program 173 in the server apparatus 103 inquires of a search program 175, and transmits a list of available printers to the information processing apparatus 101. The device manager 123 updates the respective contents of the Manufacture 301 and Printer 302 drop-down combo boxes. When the user presses a Use Disk button 304, the device manager 123 accesses the external memory 121 via the external memory I/F 117. A Cancel button 306 and a Close Dialog button 307 are used for closing the Add Printer dialog 300 of the printer. An operation for closing the Add Printer dialog 300 has been performed if a printer driver to be installed has not been determined.

Figure 4:
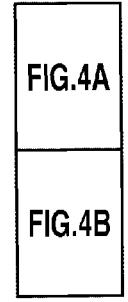
FIG. 4, which is composed of 4A and 4B, is a flowchart for illustrating installation processing according to the first exemplary embodiment.
Figure 4A:
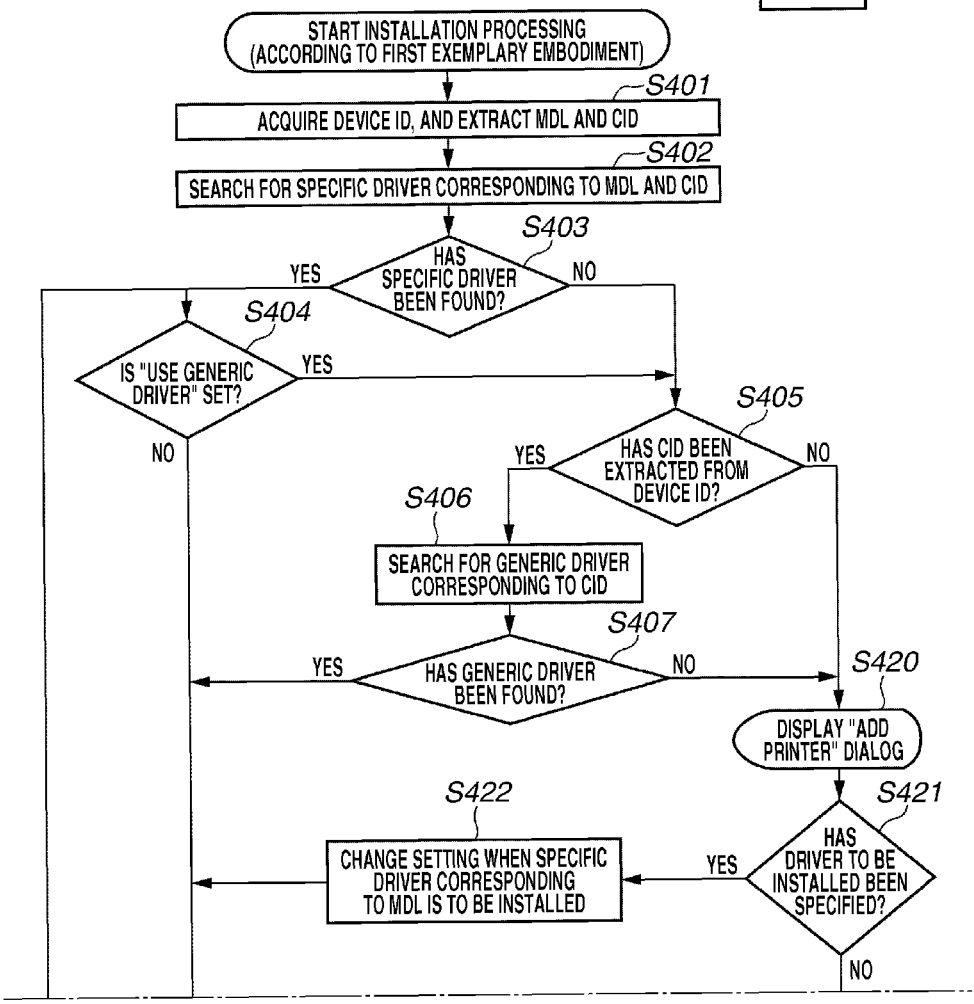
Figure 4B:
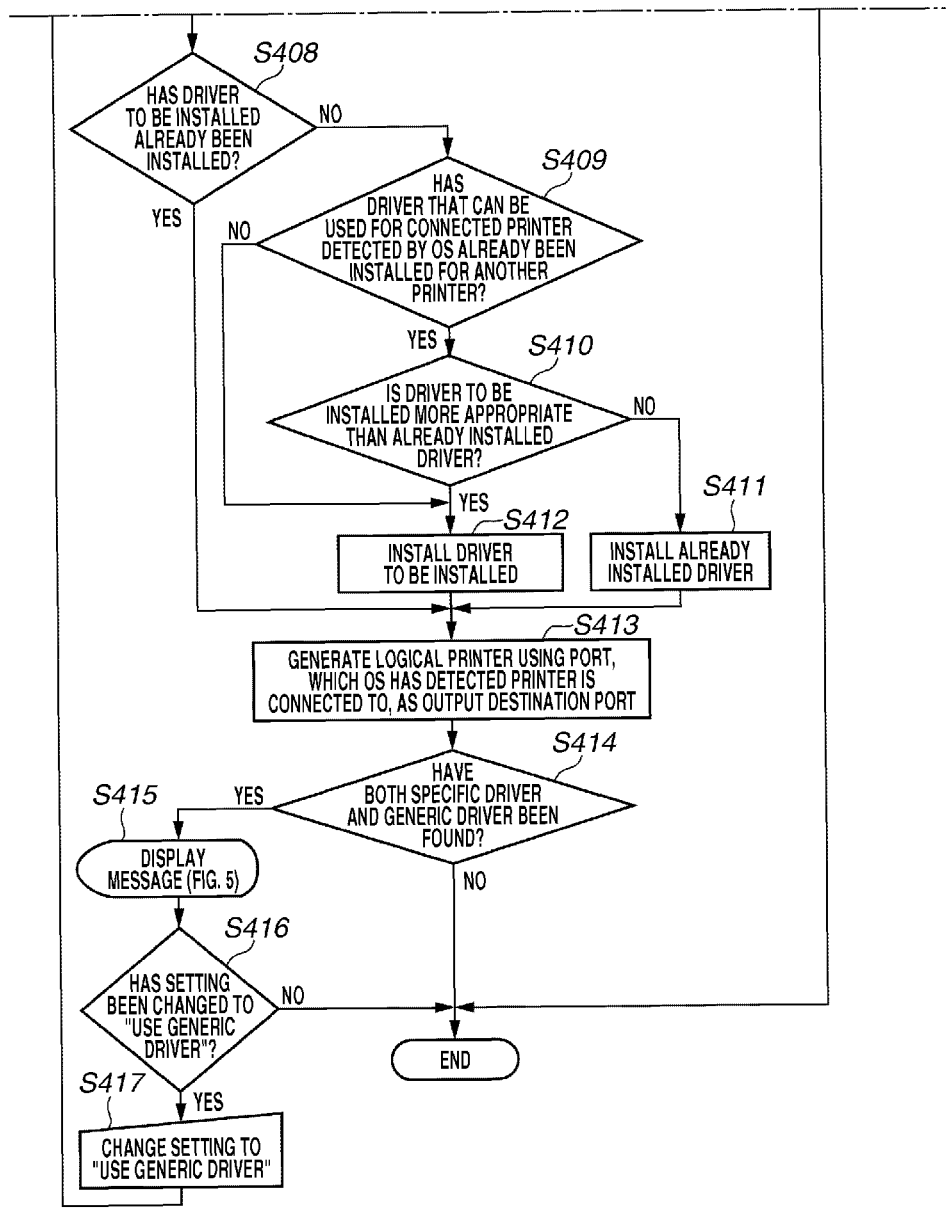

FIG. 4, which is composed of 4A and 4B, is a flowchart illustrating an example of installation processing according to the first exemplary embodiment. The installation processing is started when the OS 122 in the information processing apparatus 101 detects that the printer 102 is connected thereto. Although it is assumed here that the OS 122 performs this processing, software such as an installer, which operates on the OS 122, can perform the processing by using a search function of the OS 122.

In step S401, the device manager 123 issues a request for acquiring the device ID 143 to the printer 102, and acquires the device ID 143 from the printer 102 as a response to the request. The device manager 123 further extracts model identification information (MDL) and compatible identification information (CID) from the device ID 143. In step S402, the device manager 123 searches for a specific driver corresponding to the extracted information. In step S403, if it is determined that the specific driver has been found (YES in step S403), the processing proceeds to step S404. If it is determined that the specific driver has not been found (NO in step S403), the processing proceeds to step S405.

In step S404, the device manager 123 checks whether "Use generic driver" is set in the OS 122. If "Use generic driver" is set (YES in step S404), the processing proceeds to step S405. If "Use generic driver" is not set or the setting "Use generic driver" itself does not exist (NO in step S404), the processing proceeds to step S408. In step S405, the device manager 123 determines whether compatible identification information (CID) is included in the device ID 143 and has been extracted therefrom in step S401. If the CID has been extracted from the device ID 143 (YES in step S405), the processing proceeds to step S406. If the CID has not been extracted (NO in step S405), the processing proceeds to step S420. In step S406, the device manager 123 searches for the generic driver 128 corresponding to the CID. In step S407, the device manager 123 determines whether the generic driver 128 has been found. If the generic driver 128 has been found (YES in step S407), the processing proceeds to step S408. If the generic driver 128 has not been found (NO in step S407), the processing proceeds to step S420.

In step S420, the device manager 123 displays the dialog (FIG. 3) for receiving an input from the user to add a logical printer. The device manager 123 displays the dialog to receive an input for a printer driver to be installed from the user. In step S421, the device manager 123 waits for the user to specify the printer driver to be installed, and checks whether the printer driver to be installed has been specified. If the printer driver to be installed has not been specified (NO in step S421), the device manager 123 does not perform processing for installing a printer driver or adding a printer, and the processing is ended. If the printer driver to be installed has been specified by the user (YES in step S421), the processing proceeds to step S422. In step S422, the device manager 123 changes the setting in the OS 122 from "Use generic driver" to "Use specific driver" if installation of the specific driver corresponding to the MDL has been specified.

In step S408, the device manager 123 checks whether the printer driver to be installed, which has been determined to be found in step S403 or S407, has already been installed in the information processing apparatus 101. For example, the device manager 123 can determine whether the printer driver to be installed has already been installed by acquiring a list of printer drivers installed in the information processing apparatus 101 and checking whether a name of the printer driver instructed to be installed is included in the list. If the applicable printer driver has been found (YES in step S408), the processing proceeds to step S413. If the applicable printer driver has not been found (NO in step S408), the processing proceeds to step S409.

In step S409, the device manager 123 checks whether a printer driver, which can be used for the connected printer 102 detected by the OS 122, has already been installed for another printer. If the printer driver has already been installed (YES in step S409), the processing proceeds to step S410. If the printer driver has not been installed (NO in step S409), the processing proceeds to step S412. In step S410, the device manager 123 determines whether the printer driver to be installed is more appropriate than the printer driver found installed in the information processing apparatus 101 in step S409. If the printer driver to be installed is determined to be more appropriate (YES in step S410), the processing proceeds to step S412. Otherwise (NO in step S410), the processing proceeds to step S411. In this determination, the device manager 123, for example, compares the dates of files included in version information or configuration information between the printer drivers, and then determines that the newer printer driver is more appropriate. In step S411, the device manager 123 installs the printer driver, which has been found installed in the information processing apparatus 101 in step S409, again for the connected printer 102 detected by the OS 122. In step S412, the device manager 123 installs the printer driver to be installed in the information processing apparatus 101.

In step S413, the device manager 123 generates a logical printer using a port, which the OS 122 has detected the printer 102 is connected to, as an output destination port so as to use the printer driver that has been specified as the one corresponding to the printer 102 and then installed in the processes performed so far. Here, a "logical printer" is a logical object for using a printer driver, and is an object to be referred to as a "printer" when a print application performs printing. One logical printer has one print queue.

In step S414, the device manager 123 determines whether both the specific driver and the generic driver corresponding to the printer 102 have been found in the processes in steps S402 to S413. If only one of the drivers has been found (NO in step S414), the processing is ended. If both of the drivers have been found (YES in step S414), the processing proceeds to step S415.

Figure 5:
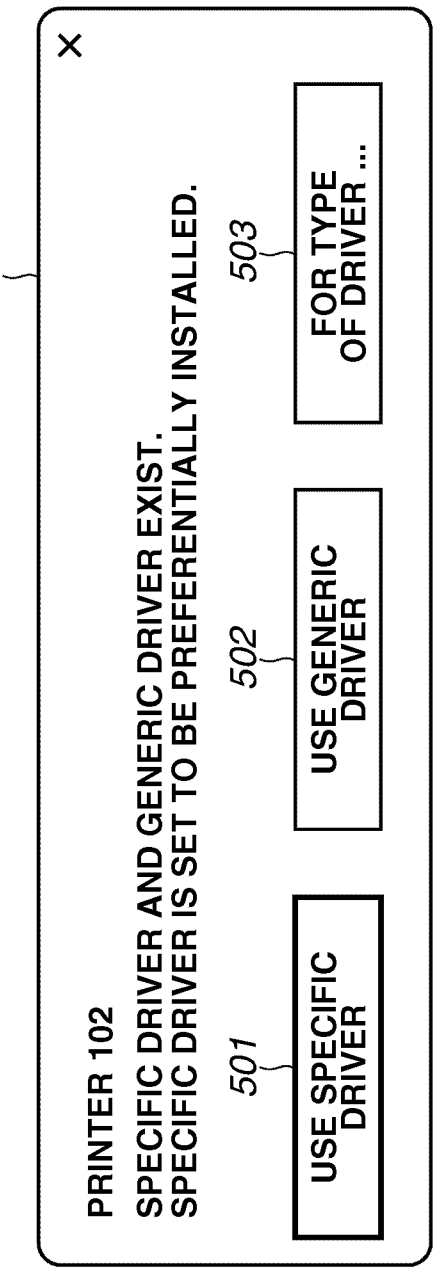
FIG. 5 illustrates an example of a user interface according to the first exemplary embodiment.

In step S415, the device manager 123 displays a message illustrated in FIG. 5 on the display 120. The device manager 123 prompts the user to select which to use preferentially, the specific driver or the generic driver, via the display screen illustrated in FIG. 5. Details of FIG. 5 will be described below. In step S416, the device manager 123 then determines whether the setting in the OS 122 has been changed to "Use generic driver" according to the selection by the user via the display screen illustrated in FIG. 5. If it is determined that the setting has been changed (YES in step S416), the processing proceeds to step S417. If the specific driver has been selected or the setting has not been changed (NO in step S416), the processing is ended. In step S417, the device manager 123 changes the setting in the OS 122 to "Use generic driver" according to the selection by the user, and the processing returns to step S404.

Through the processes illustrated in FIG. 4, even in the installation processing by the OS 122, the generic driver can be installed instead of the specific driver for a newly connected peripheral device detected by the OS 122, according to the user's intension. Further, a more appropriate driver can be installed by comparing with information about a generic driver that has already been installed.

FIG. 5 illustrates an example of a user interface including the message presented to the user in step S415 illustrated in FIG. 4. A dialog 500 for the message indicates that a specific driver and a generic driver exist and also indicates whether the current setting in the OS 122 is set to "Use specific driver" or "Use generic driver". The setting in the OS 122 is set to "Use specific driver" as default setting.

A button 501 is used for selecting the setting "Use specific driver", a button 502 is used for selecting the setting "Use generic driver", and a button 503 is used for opening a dialog that provides detailed settings for a specific driver and a generic driver. When the button 503 is pressed, the dialog 500 is closed, and the device manager 123 displays a dialog box illustrated in FIG. 6 on the display unit 120.

Figure 6:
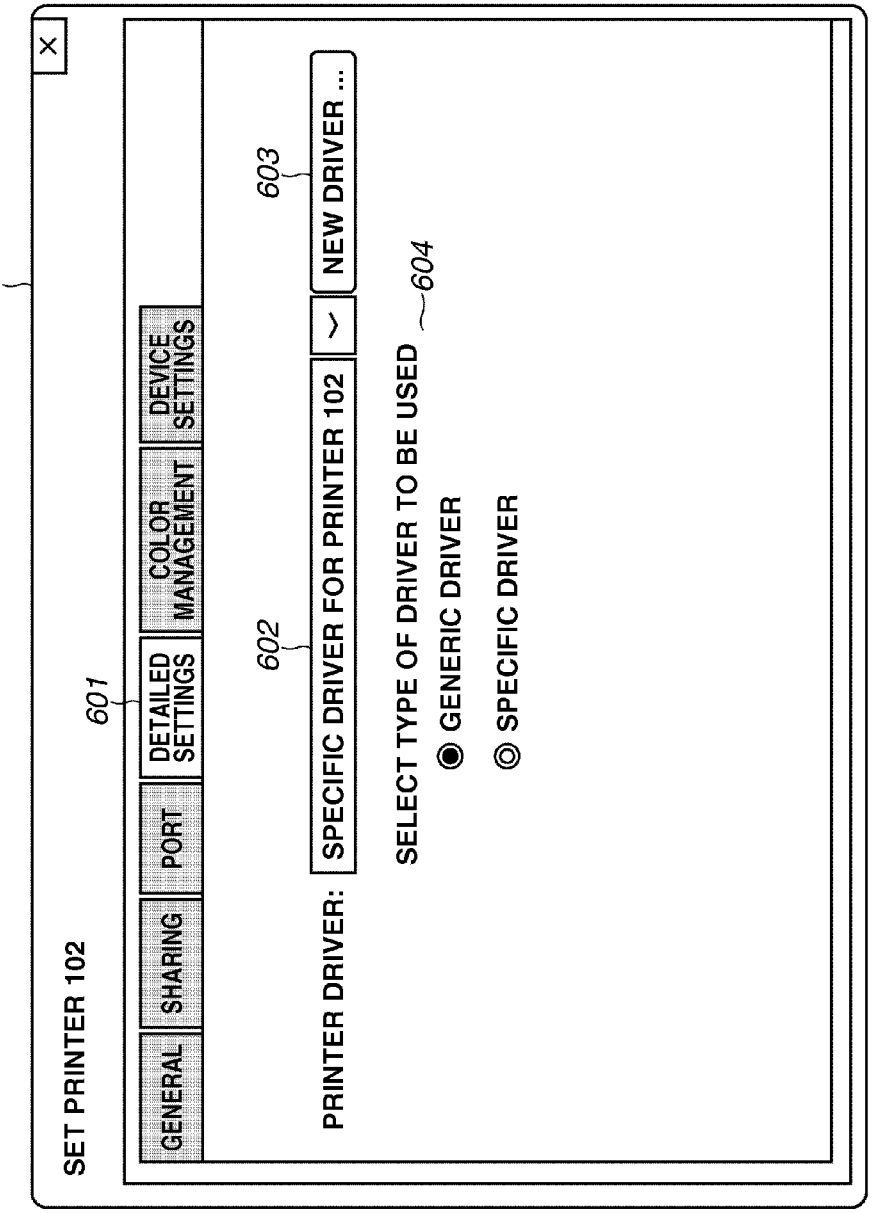
FIG. 6 illustrates another example of the user interface according to the first exemplary embodiment.

FIG. 6 illustrates an example of a user interface to be displayed when the button 503 illustrated in FIG. 5 is pressed. A dialog box 600 displays the settings of a logical printer to be managed by the device manager 123. The dialog box 600 can be used to check and reset the settings of the logical printer that has been generated, for example, in step S413 illustrated in FIG. 4.

A detailed settings tab sheet 601 allows the user to perform settings for a specific driver and a generic driver. When the button 503 is pressed, the dialog box 600 is displayed on the display unit 120 with the tab sheet 601 selected.

A drop-down combo box 602 is used to select a printer driver. The name of the printer driver installed in FIG. 4 is displayed. The drop-down combo box 602 can be used to select a desired printer driver from all lists of printer drivers installed in the information processing apparatus 101 and associate the selected printer driver with the logical printer that has been generated in step S413 illustrated in FIG. 4. An Add Driver button 603 is used for starting processing for adding a new printer driver other than candidate drivers in the drop-down combo box 602. When the Add Driver button 603 is pressed, the device manager 123 displays the screen illustrated in FIG. 3 on the display unit 120, allowing the user to perform processing for adding a printer driver to be installed. A radio button 604 is used for selecting the type of printer driver to be used. The setting selected by the radio button 604 is the current setting in the OS 122.

A second exemplary embodiment of the present disclosure will be described below. In the second exemplary embodiment, installation processing for a device driver is implemented in consideration of a group policy.

In the second exemplary embodiment, a configuration of the system and respective configurations of the information processing apparatus 101, the printer 102, and the server apparatus 103 are similar to those in the first exemplary embodiment. Here, the information processing apparatus 101 in which the OS 122 is loaded and executed is connected to the server apparatus 103 via a network 105 such as an intranet. Further, the server apparatus 103 manages a group policy associated with a user account.

In the group policy according to the second exemplary embodiment, either the setting "Use generic driver" or the setting "User specific driver" has been specified. Further, it can also be specified whether use of any driver other than the specified type of driver is prohibited. More specifically, if a network manager recommends the use of only a generic driver, the setting "Use generic driver" and the setting "Prohibit use of driver other than specified type of driver" are enabled as the group policy.

Figure 7:
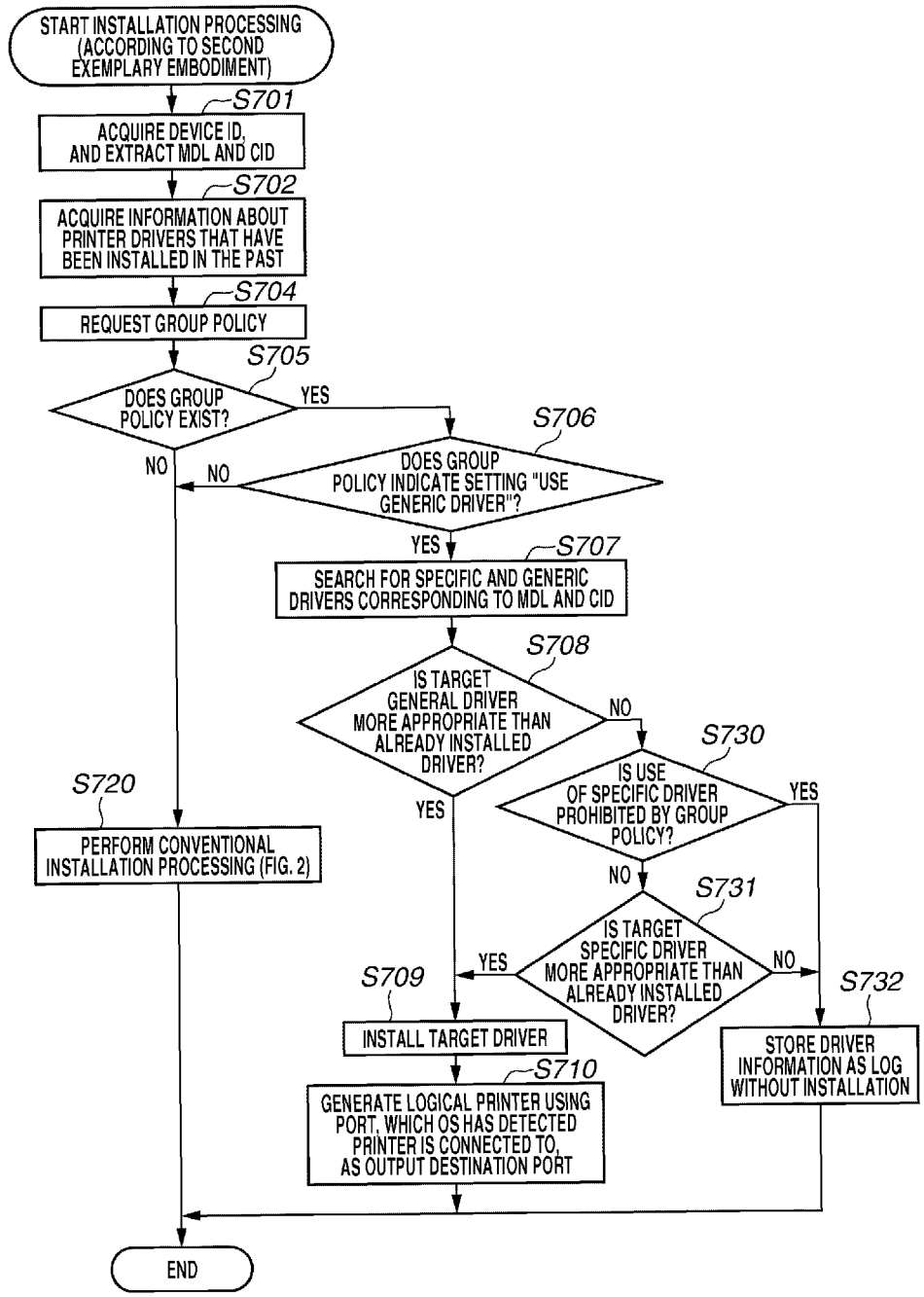
FIG. 7 is a flowchart for illustrating installation processing according to a second exemplary embodiment of the present disclosure.

FIG. 7 is a flowchart illustrating an example of installation processing by the OS 122 when the group policy is enabled. This processing is started when the OS 122 detects that the printer 102 is connected. Although it is assumed here that the OS 122 performs the processing, software such as an installer, which operates on the OS 122, can also perform the processing by using a search function of the OS 122.

In step S701, the device manager 123 issues a request for acquiring the device ID 143 to the printer 102, and acquires the device ID 143 from the printer 102 as a response to the request. The device manager 123 further extracts model identification information (MDL) and compatible identification information (CID) from the device ID 143.

In step S702, the device manager 123 acquires information about printer drivers that have been installed in the past. Here, the device manager 123 acquires at least one of a name list of printer drivers installed in the information processing apparatus 101 and log information of installation processing performed in the past, for example. By checking the list(s), the device manager 123 can determine whether a printer driver to be installed this time has already been installed. Further, the device manager 123 checks a printer driver, which was not actually installed but was available, from the log information, to increase the efficiency and the speed of driver search processing. In step S704, the device manager 123 inquires of a policy manager 124 and requests a group policy relating to the printer driver. If the group policy exists, the policy manager 124 sends the group policy to the information processing apparatus 101 as a response to the request.

In step S705, the device manager 123 determines whether the group policy exists. If the group policy exists (YES in step S705), the processing proceeds to step S706. If the group policy does not exist (NO in step S705), the processing proceeds to step S720. In step S706, the device manager 123 determines whether the group policy indicates the setting "Use generic driver". If the group policy indicates the setting "Use generic driver" (YES in step S706), the processing proceeds to step S707. If the group policy does not indicate the setting "Use generic driver", i.e., if the group policy indicates the setting "Use specific driver" (NO in step S706), the processing proceeds to step S720. In step S720, the device manager 123 performs the installation processing illustrated in FIG. 2, and the processing is ended.

In step S707, the device manager 123 searches for specific and generic drivers corresponding to model identification information (MDL) and compatible identification information (CID) extracted from the device ID 143. In step S708, the device manager 123 determines whether the generic driver has been found and the found generic driver is more appropriate than the printer driver that has already been installed. If the found generic driver is determined to be more appropriate (YES in step S708), the processing proceeds to step S709. Otherwise (NO in step S708), the processing proceeds to step S730. If the generic driver 128 has not been found in the search in step S707, the processing proceeds to step S730. If a printer driver corresponding to the connected printer 102 detected by the OS 122 has not yet been installed, the processing proceeds to step S709. In the determination in step S708, the device manager 123, for example, compares the dates of files included in version information or configuration information between the printer drivers and then determines that the newer printer driver is more appropriate.

In step S730, the device manager 123 determines whether the use of the specific driver is prohibited by the group policy. If the use of the specific driver is prohibited (YES in step S730), the processing proceeds to step S732. If the use of the specific driver is not prohibited (NO in step S730), the processing proceeds to step S731. In step S731, the device manager 123 determines whether the specific driver has been found and the found specific driver is more appropriate than the printer driver that has already been installed. If the found specific driver is more appropriate (YES in step S731), the processing proceeds to step S709. Otherwise (NO in step S731), the processing proceeds to step S732. If the specific driver has not been found in step S707, the processing proceeds to step S732. If a printer driver corresponding to the connected printer 102 detected by the OS 122 has not yet been installed, the processing proceeds to step S709. In step S732, the device manager 123 stores, even if a printer driver has been found in step S707, information about the printer driver as a log without performing installation processing. The processing illustrated in FIG. 7 is then ended.

In step S709, the device manager 123 controls installation processing for the generic driver or the specific driver that has been found in step S707. In step S710, the device manager 123 generates a logical printer using a port, which the OS 122 has detected the printer 102 is connected to, as an output destination port so as to use the installed printer driver. The processing illustrated in FIG. 7 is then ended.

Figure 8:
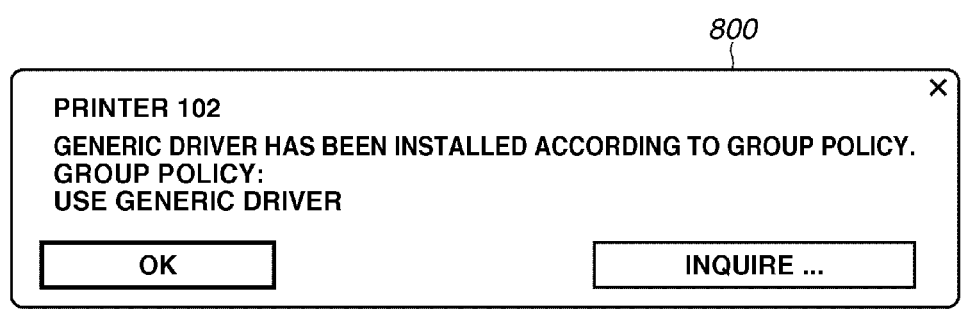
FIG. 8 illustrates an example of a user interface according to the second exemplary embodiment.

FIG. 8 illustrates a notification screen 800 displayed in the information processing apparatus 101 when the generic driver has been installed according to the group policy in step S710. On the notification screen 800, the content of the group policy (e.g., "Use generic driver" is set.) and a notification that the installation has been completed are displayed. When the user presses an "Inquire . . . " button, the device manager 123 can send a message to a manager of the group policy as a function of the OS 122.

Figure 9:
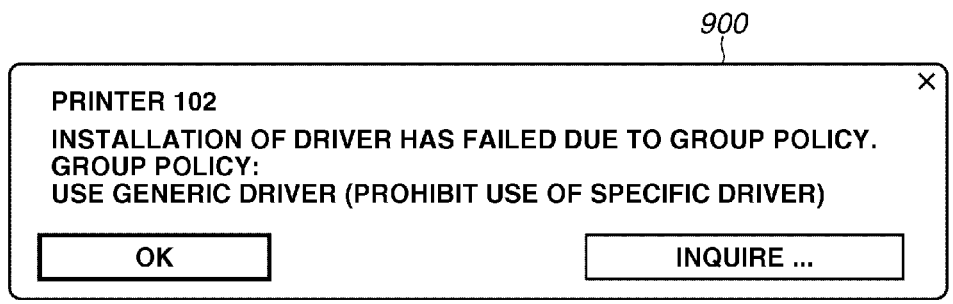
FIG. 9 illustrates another example of the user interface according to the second exemplary embodiment.

FIG. 9 illustrates a notification screen 900 displayed in the information processing apparatus 101 when the installation processing has not been performed in step S732. On the notification screen 900, the content of the group policy (e.g., "Use generic driver" is set.) and a notification that the installation has not been performed are displayed. When the user presses an "Inquire . . . " button, the device manager 123 can send a message to the manager of the group policy as a function of the OS 122.

The setting of the group policy described in the second exemplary embodiment and the setting of the OS described in the first exemplary embodiment may be used in combination. More specifically, the device manager 123 performs control, if one of the settings has not been performed, to perform installation processing for a printer driver according to the other setting. The device manager 123 performs control, if both of the settings have been performed, to perform installation processing while giving the setting of the group policy a higher priority.

A third exemplary embodiment of the present disclosure will be described below. In the third exemplary embodiment, it is assumed that all printer drivers corresponding to a newly connected printer are to be installed.

In the third exemplary embodiment, a configuration of the system and respective configurations of the information processing apparatus 101, the printer 102, and the server apparatus 103 are similar to those in the first exemplary embodiment.

Figure 10:
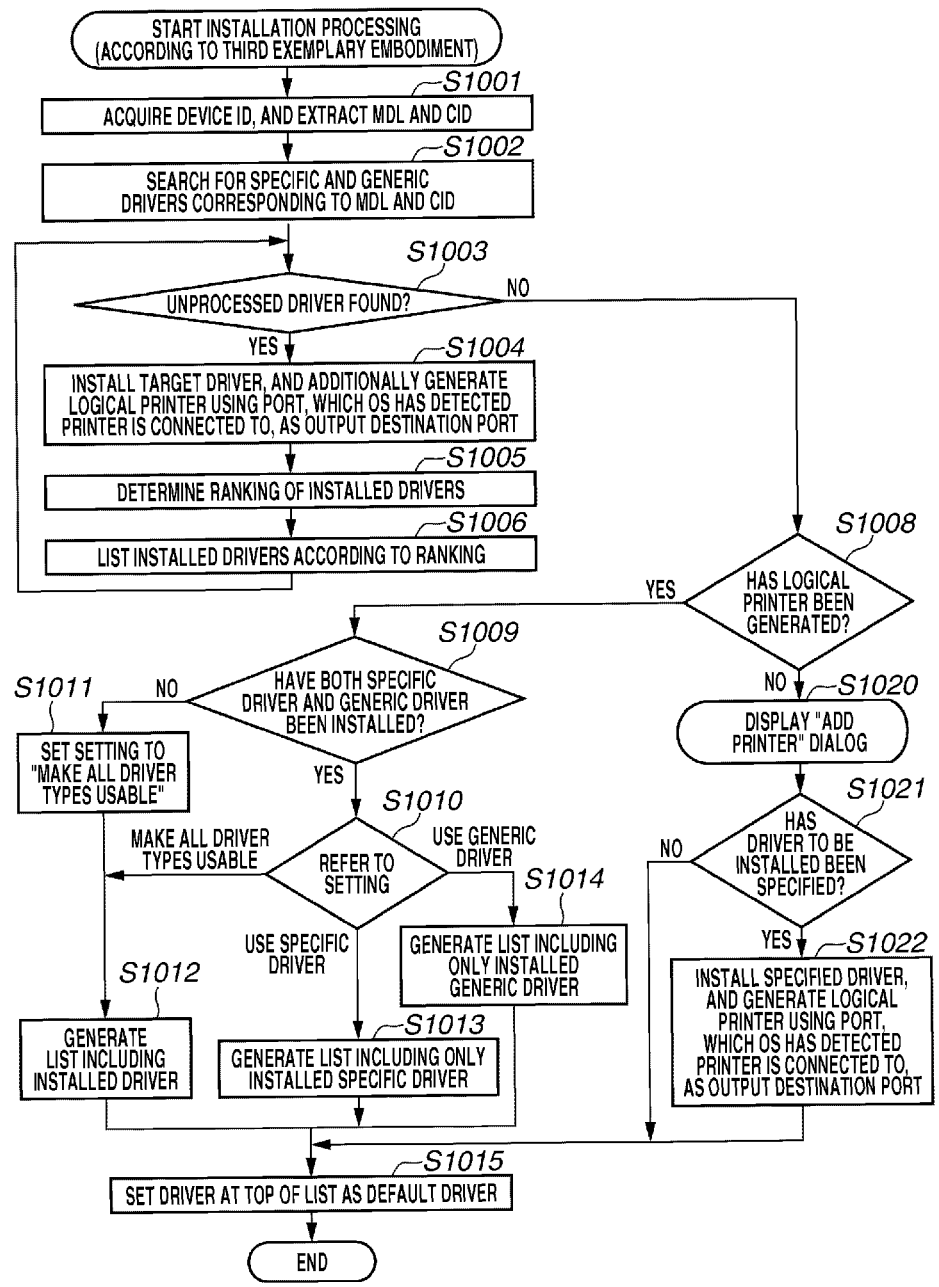
FIG. 10 is a flowchart for illustrating installation processing according to a third exemplary embodiment of the present disclosure.

FIG. 10 is a flowchart illustrating an example of installation processing by the OS 122 in the third exemplary embodiment. This processing is started when the OS 122 detects that the printer 102 is connected. Although it is assumed here that the OS 122 performs the processing, software such as an installer, which operates on the OS 122, can also perform the processing by using a search function of the OS 122.

In step S1001, the device manager 123 issues a request for acquiring the device ID 143 to the printer 102, and acquires the device ID 143 from the printer 102 as a response to the request. The device manager 123 further extracts model identification information (MDL) and compatible identification information (CID) from the device ID 143. In step S1002, the device manager 123 searches for specific and generic drivers corresponding to the MDL and the CID extracted from the device ID 143.

In step S1003, the device manager 123 determines whether any of the drivers, which have been found in the search processing in step S1002, has not been subjected to processes in steps S1004 to S1006. If an unprocessed driver has been found (YES in step S1003), the processing proceeds to step S1004. If an unprocessed driver has not been found (NO in step S1003), the processing proceeds to step S1008. In steps S1004 to S1006, the device manager 123 performs processing on one of the unprocessed drivers, which have been found in the search processing in step S1002, as a target.

In step S1004, the device manager 123 installs the target printer driver. The device manager 123 adds and generates a logical printer using a port, which the OS 122 has detected the printer 102 is connected to, as an output destination port. In the third exemplary embodiment, a plurality of printer drivers can be installed for one print queue. A user uses a desired printer driver by switching the printer driver that has been installed as needed. In step S1005, the device manager 123 determines ranking of the printer drivers that have already been installed. For example, the device manager 123 compares the dates of files included in version information or configuration information among the installed printer drivers and then determines the ranking of the printer drivers. In step S1006, the device manager 123 generates a list of printer drivers corresponding to the print queue according to the ranking determined in step S1005.

In step S1008, the device manager 123 determines whether a logical printer has been generated. If the processes in steps S1004 to S1006 have not been performed, the logical printer has not been generated. If the logical printer has been generated (YES in step S1008), the processing proceeds to step S1009. If the logical printer has not been generated (NO in step S1008), the processing proceeds to step S1020.

In step S1009, the device manager 123 determines whether both the specific driver and the generic driver corresponding to the connected printer 102 detected by the OS 122 have been installed. If both of the drivers have been installed (YES in step S1009), the processing proceeds to step S1010. If only one of the drivers has been installed (NO in step S1009), the processing proceeds to step S1011. In step S1010, the device manager 123 refers to the setting for the type of printer driver to be used. As a result of the reference in step S1010, if "Make all driver types usable" is set, the processing proceeds to step S1012. If "Use only specific driver" is set, the processing proceeds to step S1013. If "Use only generic driver" is set, the processing proceeds to step S1014. In step S1011, the device manager 123 sets the setting for the type of printer driver to be used to "Make all driver types usable".

In step S1012, the device manager 123 generates a driver list including the installed drivers. The specific driver and the generic driver are arranged in an upper part and a lower part of the list, respectively. In step S1013, the device manager 123 generates a driver list including only the installed specific drivers. In step S1014, the device manager 123 generates a driver list including only the installed generic drivers.

The list generated in the processes in steps S1012 to S1014 is used for managing a printer driver to be used in printing by the printer 102. This list is made by ordering the printer drivers according to the ranking determined in the processes in steps S1005 to S1006. The list is information used for displaying and selecting a printer driver to be used by the user on a dialog box of the printer 102 illustrated in FIG. 11 to be described below, and is stored as user information of the OS 122 in the external memory 121.

In step S1015, the device manager 123 then sets a printer driver listed at the top of the generated driver list to a default printer driver. The processing is then ended.

In step S1020, the device manager 123 displays a dialog (FIG. 3) for receiving an input from the user to add a logical printer. In step S1021, the device manager 123 checks whether a printer driver to be installed has been specified by the user. If the printer driver to be installed has not been specified (NO in step S1021), the device manager 123 does not perform processing for installing a printer driver or adding a printer, and the processing is ended. If the printer driver to be installed has been specified (YES in step S1021), the processing proceeds to step S1022. In step S1022, the device manager 123 installs the specified printer driver, generates a logical printer using a port, which the OS 122 has detected the printer 102 is connected to, as an output destination port, and then the processing is ended.

FIG. 11 illustrates an example of a setting screen 1100 relating to the printer 102, on which one or more printer drivers installed for the same print queue are displayed and selected, as a result of the printer driver installation processing illustrated in FIG. 10. The setting screen 1100 is a dialog box for displaying the settings of a logical printer to be managed by the device manager 123 in the OS 122. On the setting screen 1100, one or more printer drivers, which have been installed, can be displayed and selected using the driver list generated in the processing illustrated in FIG. 10. A change to the settings made by the user in the dialog box takes effect on an event that will occur in the OS 122 next time.

A radio button 1102 is used for selecting the setting for the type of printer driver to be used. The radio button enables the current setting. A drop-down combo box 1103 is used for selecting a printer driver to be used. On the drop-down combo box 1103, the driver list generated in the processing illustrated in FIG. 10 is displayed. A selected desired printer driver is associated with the logical printer generated in FIG. 10. The printer driver, which has been set as a default printer driver in step S1015 illustrated in FIG. 10, is default displayed in the drop-down combo box 1103. A button 1104 is used for issuing an instruction to start processing for adding a new printer driver that cannot be selected by the drop-down combo box 1103. When the button 1104 is pressed, the device manager 123 displays the Add Printer dialog 300 illustrated in FIG. 3 on the display unit 120.

Through the above-described processes, the device manager 123 installs all printer drivers that can be installed, and generates a driver list in the priority order. Thus, a more appropriate printer driver can be selected, for example, by comparing with generic printer drivers that have already been installed. Further, if use of only a generic driver is set by the user, a generic driver can be easily used instead of a specific driver.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-029949 filed Feb. 19, 2013, which is hereby incorporated by reference herein in its entirety.

What is claimed is:

1. An information processing apparatus that communicates with a peripheral device, the information processing apparatus comprising:
    a setting unit configured to set, as a type of a device driver to be used, either of a specific driver and a generic driver to an operating system of the information processing apparatus;
    a receiving unit configured to receive model information and compatible identification information as device information from the peripheral device;
    a first search unit configured to search for a specific driver for the peripheral device corresponding to the model information;
    a second search unit configured to search for a generic driver corresponding to the compatible identification information;
    a control unit configured to control, if the setting unit has set a generic driver of the type of the device driver, installation of the generic driver found by the second search unit even if the first search unit has found the specific driver; and
    a display unit configured to, if the first search unit has found the specific driver and the second search unit has found the generic driver, display a screen for changing settings made by the setting unit,
    wherein the control unit controls installation of the specific driver if the first search unit has found the specific driver and if the setting unit has set a specific driver as the type of the device driver.

2. The information processing apparatus according to claim 1, wherein the control unit installs a different generic driver for the peripheral device, if another generic driver capable of controlling the peripheral device has already been installed when the generic driver found by the second search unit is to be installed.

3. The information processing apparatus according to claim 2, wherein the control unit determines the different generic driver by comparing dates of files included in version information or configuration information between device drivers.

4. The information processing apparatus according to claim 1, further comprising:

a specifying unit configured to cause, if the first search unit and the second search unit have not found any device driver, a user to specify a device driver to be installed, wherein the setting unit is configured to change, if the setting unit has set a generic driver as the type of the device driver and the device driver specified by the user is a specific driver, a setting of the type of the device driver from a generic driver to a specific driver, and wherein the control unit controls installation of the device driver specified by the user.

5. The information processing apparatus according to claim 1, further comprising an acquisition unit configured to acquire a group policy, wherein the control unit preferentially controls, if the acquired group policy has a setting indicating use of a generic driver, the installation of the generic driver found by the second search unit even if the first search unit has found the specific driver.

6. The information processing apparatus according to claim 1, wherein the generic driver includes a generic driver that has been subjected to customized settings, and wherein the second search unit searches a server apparatus on a network for the generic driver that has been subjected to the customized settings.

7. A method for an information processing apparatus that communicates with a peripheral device, the method comprising:

setting, as a type of a device driver to be used, either of a specific driver and a generic driver to an operating system of the information processing apparatus;

receiving model information and compatible identification information as device information from the peripheral device;

searching for a specific driver for the peripheral device corresponding to the model information;

searching for a generic driver corresponding to the compatible identification information;

controlling, if the setting has set a generic driver as the type of the device driver, installation of the generic driver found in the generic driver search even if the specific driver has been found in the specific driver search;

displaying, if the specific driver search has found the specific driver and the generic driver search has found the generic driver, a screen for changing settings made by the setting; and controlling installation of the specific driver if the specific driver has been found in the specific driver search and if the setting has set a specific driver as the type of the device driver.

8. The method according to claim 7, further comprising installing a different generic driver for the peripheral device if another generic driver capable of controlling the peripheral device has already been installed when the generic driver found in the generic driver search is to be installed.

9. The method according to claim 8, further comprising determining the different generic driver by comparing dates of files included in version information or configuration information between device drivers.

10. The method according to claim 7, further comprising:

causing a user to specify a device driver to be installed if no device driver has been found in the specific driver search or the generic driver search, wherein the setting changes, if the setting has set a generic driver as the type of the device driver and the device driver specified by the user is a specific driver, a setting of the type of the driver from a generic driver to a specific driver; and controlling installation of the device driver specified by the user.

11. The method according to claim 7, further comprising:

acquiring a group policy; and controlling, if the acquired group policy has a setting indicating use of a generic driver, the installation of the generic driver found in the generic driver search even if the specific driver has been found in the specific driver search.

12. The method according to claim 7, wherein the generic driver includes a generic driver that has been subjected to customized settings, and wherein, in the generic driver search, a server apparatus on a network is searched for the generic driver that has been subjected to the customized settings.

13. A non-transitory computer-readable storage medium storing a computer program that causes a computer to execute a method for an information processing apparatus that communicates with a peripheral device, the method comprising:

setting, as a type of a device driver to be used, either of a specific driver and a generic driver to an operating system of the information processing apparatus;

receiving model information and compatible identification information as device information from the peripheral device;

searching for a specific driver for the peripheral device corresponding to the model information;

searching for a generic driver corresponding to the compatible identification information;

controlling, if the setting has set a generic driver as the type of the device driver, installation of the generic driver found in the generic driver search even if the specific driver has been found in the specific driver search;

displaying, if the specific driver search has found the specific driver and the generic driver search has found the generic driver, a screen for changing settings made by the setting; and controlling installation of the specific driver if the specific driver has been found in the specific driver search and if the setting has set a specific driver as the type of the device driver.

* * * * *